(12) United States Patent  
Bormioli

(10) Patent No.: US 8,991,782 B2  
(45) Date of Patent: Mar. 31, 2015

(54) DEVICE FOR AUTOMATIC CLOSURE OF CONTROL VALVES IN SEPARABLE CONNECTION UNITS FOR FLEXIBLE PIPES

(75) Inventor: Lorenzo Bormioli, Padova (IT)

(73) Assignee: MIB Italiana S.p.A., Casalserugo PD (IT)

( * ) Notice: Subject to any disclaimer, the term of this patent is extended or adjusted under 35 U.S.C. 154(b) by 125 days.

(21) Appl. No.: 13/992,047

(22) PCT Filed: Oct. 25, 2011

(86) PCT No.: PCT/EP2011/068633  
§ 371 (c)(1),  
(2), (4) Date: Aug. 20, 2013

(87) PCT Pub. No.: WO2012/076240  
PCT Pub. Date: Jun. 14, 2012

(65) Prior Publication Data  
US 2013/0319560 A1 Dec. 5, 2013

(30) Foreign Application Priority Data

Dec. 6, 2010 (IT) .............................. MI2010A2247

(51) Int. Cl.  
*F16K 31/12* (2006.01)  
*F16L 55/10* (2006.01)

(52) U.S. Cl.  
CPC .................................. *F16L 55/1007* (2013.01)  
USPC ......... 251/48; 251/62; 251/149.2; 251/149.6; 251/212; 251/228; 137/68.14; 137/614; 166/321

(58) Field of Classification Search  
USPC ............... 251/48, 62, 149–149.2, 149.8, 212, 251/213, 228; 137/68.14–68.16, 614, 137/614.02–614.06, 798–799; 166/321  
See application file for complete search history.

(56) References Cited

U.S. PATENT DOCUMENTS

| | | | |
|---|---|---|---|
| 2,798,561 A * | 7/1957 | True ............................... | 166/321 |
| 4,127,142 A | 11/1978 | Snider | |
| 4,326,555 A | 4/1982 | Thomson | |
| 4,860,991 A * | 8/1989 | Blizzard et al. .................. | 251/62 |
| 4,986,357 A * | 1/1991 | Pringle ........................... | 166/319 |
| 5,293,943 A * | 3/1994 | Williamson, Jr. ............. | 166/319 |
| 5,318,127 A * | 6/1994 | Hines et al. .................... | 166/321 |

FOREIGN PATENT DOCUMENTS

| | | |
|---|---|---|
| FR | 1 429 668 | 2/1966 |
| IT | MI 2009A002146 | 6/2011 |

* cited by examiner

*Primary Examiner* — Marina Tietjen  
(74) *Attorney, Agent, or Firm* — Jacobson Holman, PLLC

(57) ABSTRACT

A device for automatic closure of control valves in separable connection units for flexible pipes is described. The device comprises, for every sector of the control valve, a slidable body operating on the valve sector to cause closing and opening rotation thereof, elastic means housed within a first chamber to activate the sliding body to cause the closing rotation of said valve sector, a braking fluid housed in a second chamber to brake the movement of said sliding body in the closing direction and fluid dynamic communication means between said chambers to permit the controlled transfer of the braking fluid from the second chamber to the first chamber during the movement of the sliding body in the closing direction. The fluid dynamic communication means comprise a passage duct with an enlarged part and a cartridge with external grooves of variable length inserted in said enlarged part.

2 Claims, 7 Drawing Sheets

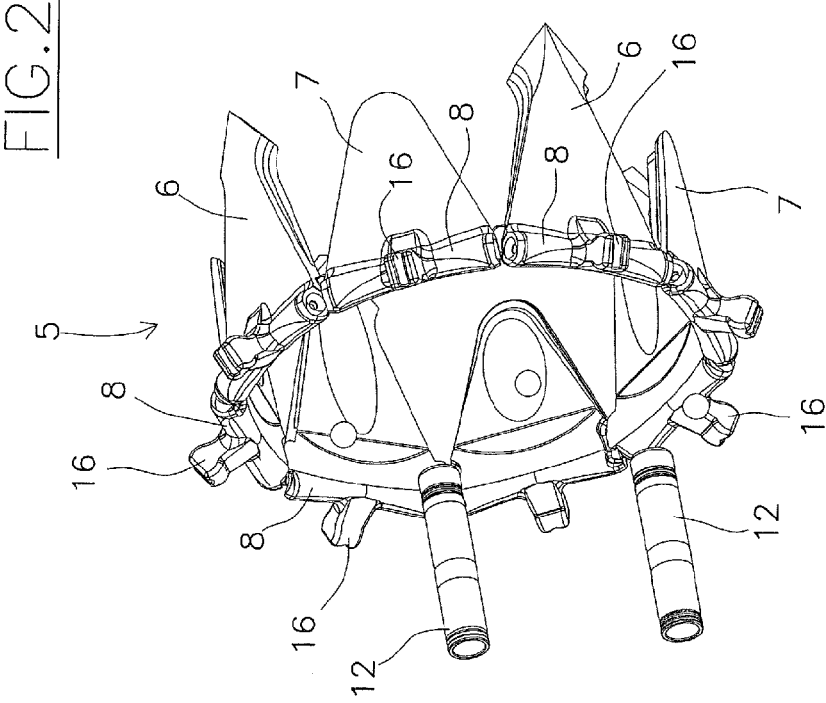
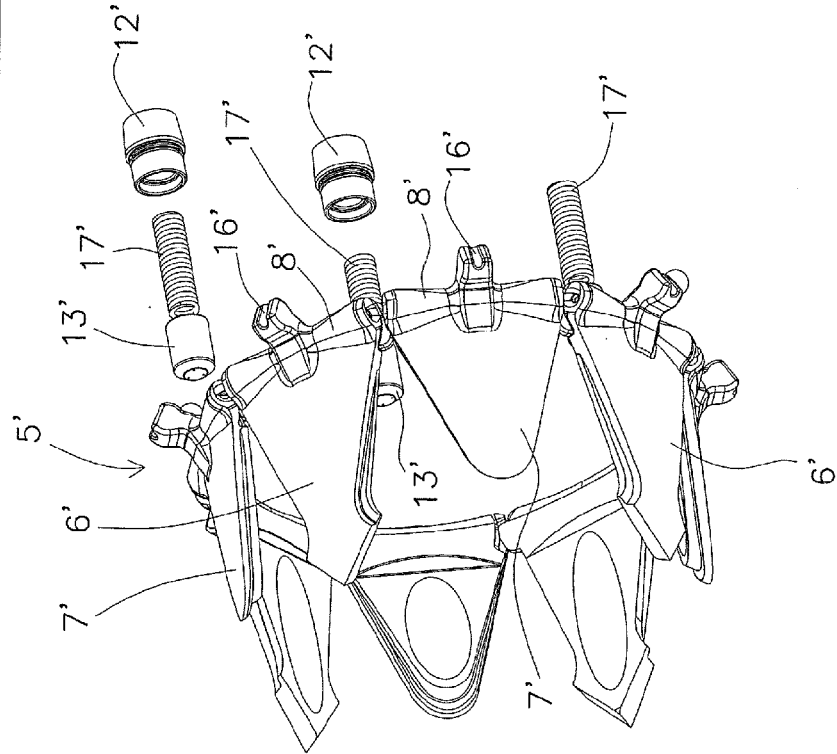

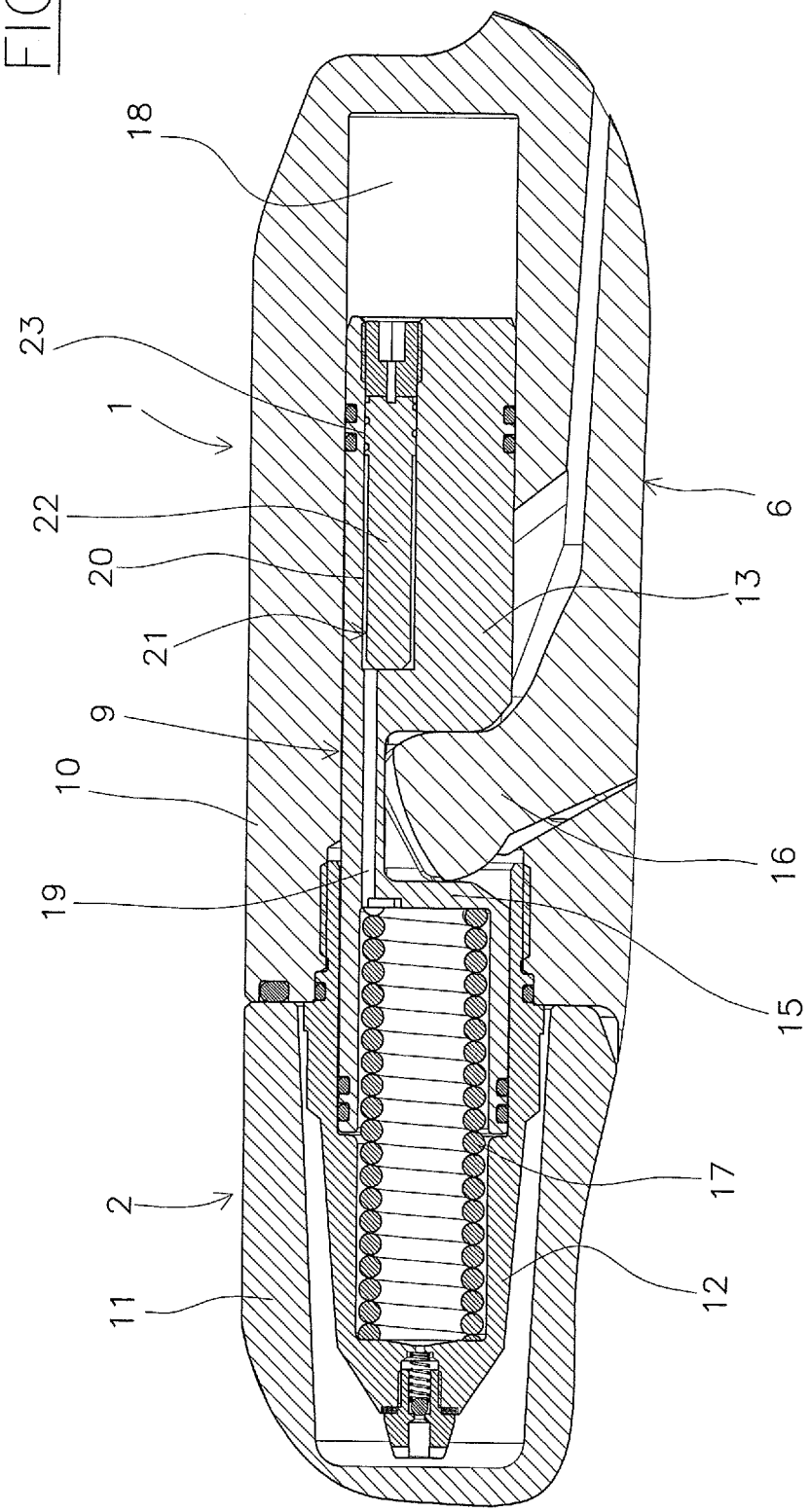

DEVICE FOR AUTOMATIC CLOSURE OF CONTROL VALVES IN SEPARABLE CONNECTION UNITS FOR FLEXIBLE PIPES

This is a national stage of PCT/EP11/068633 filed Oct. 25, 2011 and published in English, which has a priority of Italy no. MI2010A002247 filed Dec. 6, 2010, hereby incorporated by reference.

The present invention relates to a device for automatic closure of control valves in separable connection units for transferring pipes of fluid products, in particular petroleum products which include the automatic separation of the tubes themselves in case of strong axial traction stress and/or sudden high pressure.

The sea transfer of petroleum products from petrochemical installation, from platform, from tanker to tanker, from tanker to land installation and vice versa notoriously occurs by means of flexible tubes and connection units of the tubes themselves which consist of two separable parts, each provided with a respective control valve which automatically closes upon separation to limit the spillage of product into the sea, with consequent less pollution of the same. These connection units are positioned on the part of the flexible tube positioned in the sea and have the primary objective of protecting the tube, and, more in general, the connection line, in case of anomalous situations which cause excessive pulling on the tube or excessive pressure on the line. Such anomalous situations may be: tanker, or, more in general, petroleum installation (FPSO) which breaks away and drifts off, rough sea causing traction on the tube beyond the limits, boat knocking into the tube dragging it away and creating excessive loads on the same, rapid closing of the downstream flow valve or any other reason causing excessive axial load and/or pressure increase.

The control units currently available are made so that the control valves are closed after the separation of the two parts of the connection unit automatically, i.e. without control by an operator in the aforesaid situations.

Separable connection units are also known which comprise fluid control valves of the variable sector type, i.e. formed by a plurality of slices or petals, which are made to turn between an opening position, in which the slices or petals are substantially parallel to the direction of flow of the petroleum product, and a closing position, in which the slices or petals converge transversally to the axis of the unit to completely block the flow of product. The movement from the opening position to the closing position occurs under the bias of elastic means when appropriate withholding means, e.g. an inner axially removable sleeve, cease to exert the withholding action following the axial traction stress impressed on the connection unit. Fluid dynamic brakes, e.g. cylinders subjected to the pressure of the fluid product present in the tube, appropriately slow down the closing speed of the upstream valve to avoid excessive pressure, called water hammer, determined by the thrust of the elastic means and of the pressurized fluid.

The known fluid dynamic brakes comprise reduced section passage ducts which have the drawback of getting obstructed by effect of the dirt present in the brake fluid.

It is the object of the present invention to make a device for automatic closure of control valves of the slices or petals type or, more in general, with rotatable sectors, which integrates in single unit the two elastic thrust and fluid dynamic functions without displaying the drawbacks of the pipes of reduced section according to the prior art.

In accordance with the invention, such an object is reached by a device characterized in that it comprises, for every sector of the control valve upstream of the direction of the fluid flow, a slidable body operating on said valve sector to cause closing and opening rotation thereof, elastic means housed in a first chamber to activate said sliding body in a direction suitable to cause the closing rotation of said valve sector, a braking fluid housed in a second chamber to brake the movement of said sliding body in the closing direction of said valve sector and fluid dynamic communication means between said chambers to permit the controlled transfer of said braking fluid from the second chamber to the first chamber during the movement of said sliding body in the direction of closure of said valve sector, said fluid dynamic communication means comprising a cartridge element inserted in an axial housing of the sliding body and defining therewith an external passage duct of the braking fluid which has a helical shape with variable extension according to the required closing speed of said valve sector.

The aforesaid helical portion of the cartridge element makes it possible to obtain a valid braking effect with much larger passage duct section, which cannot be obstructed in practice by the dirt present in the braking fluid.

A currently preferred practical embodiment of the present invention is shown by way of non-limitative example in the accompanying drawings, in which:

FIG. 2 shows a perspective exploded view of the control valve upstream of the connection unit in FIG. 1;

FIG. 3 shows a perspective exploded view of the control valve downstream of the connection unit in FIG. 1;

FIG. 4 shows an enlarged detail, sectioned as shown in FIG. 1, of a device according to the present invention, used for closing a rotational sector of the control valve upstream of the connection unit in FIG. 1;

FIG. 1 shows a connection unit for flexible tubes, which comprises two separable parts or bodies 1 and 2, respectively, upstream and downstream in the direction of flow of the transported fluid product.

The two parts 1 and 2 are connected by burst screws 3, which in case of strong traction stress (equal to or higher than the setting load) break making it possible to separate the two parts.

Figure 1:
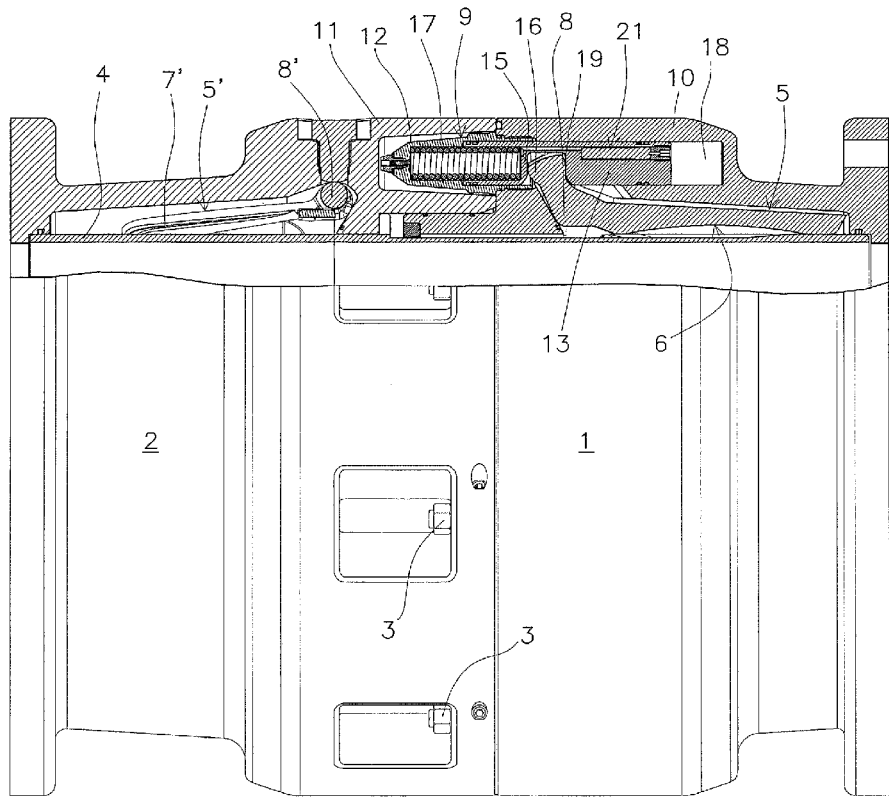
FIG. 1 shows the whole, partially sectioned in axial direction, of a connection unit for flexible tubes which includes automatic dosing devices of the control valves.

A cylindrical sliding sleeve 4 (FIG. 1), which is automatically and axially removable from the connection unit when the two parts of the unit are separated, is arranged in the connection unit.

Figure 5:
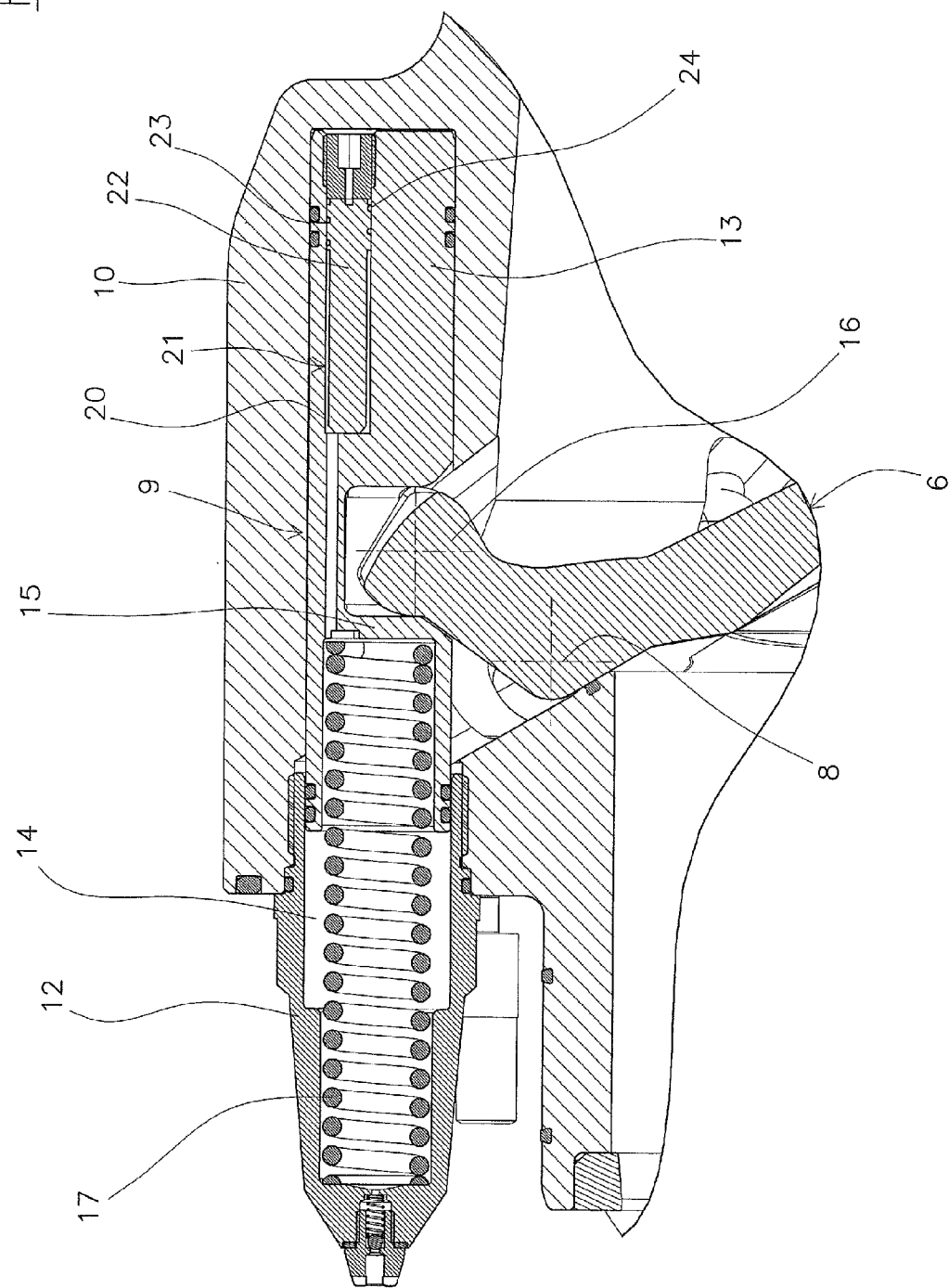
FIG. 5 shows the same device during the step of closing of the aforesaid rotational sector.
Figure 6:
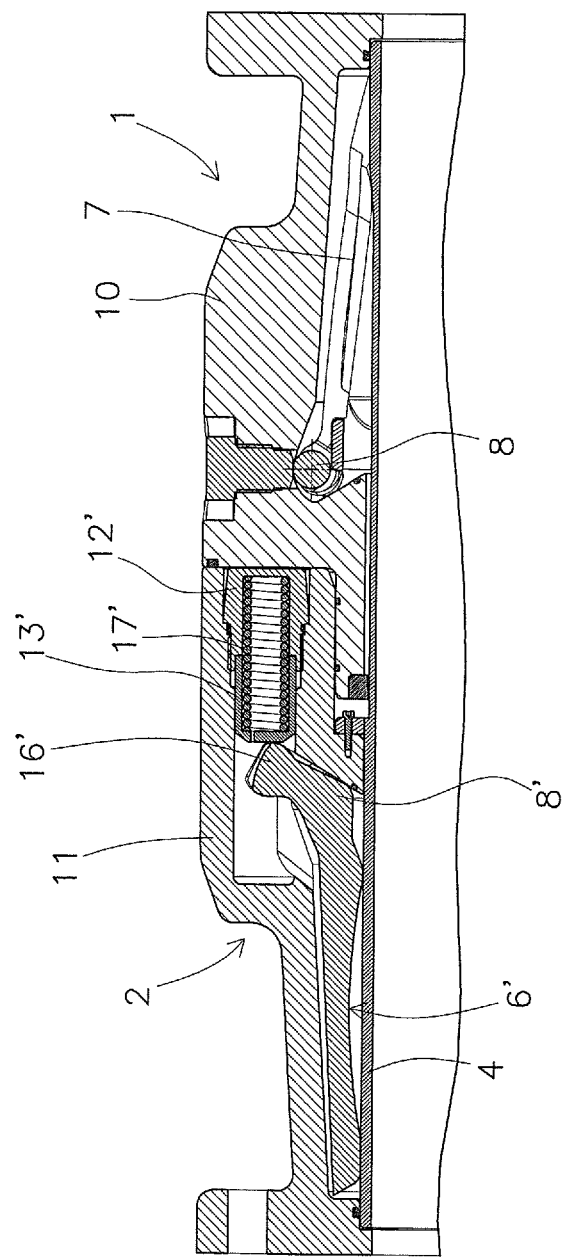
FIG. 6 shows an enlarged detail, sectioned in axial direction, of a device used for closing a rotational sector of the control valve downstream of the connection unit in FIG. 1.
Figure 7:
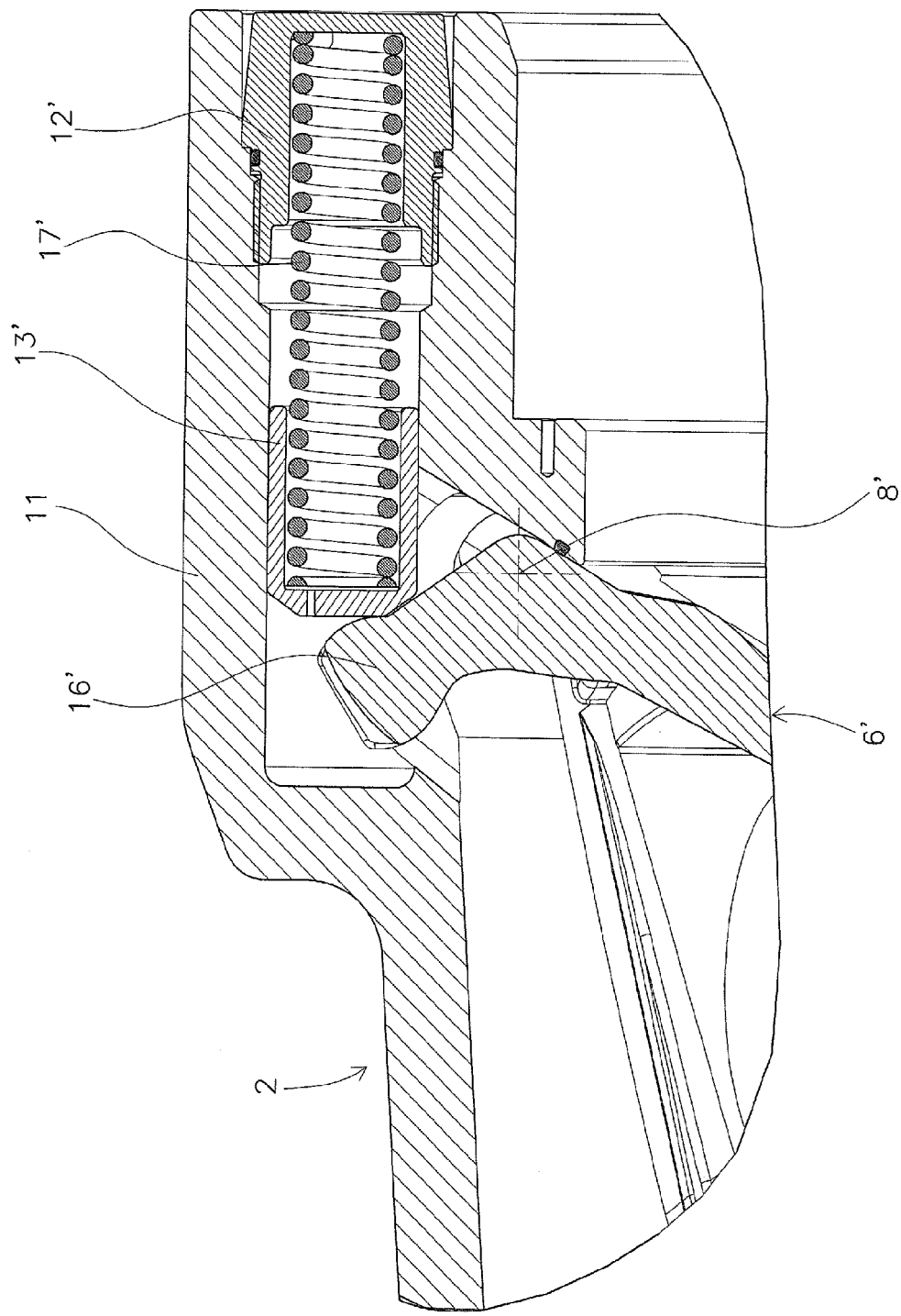
FIG. 7 shows the device in FIG. 6 during the step of closing of the aforesaid rotational sector.

The cylindrical sleeve 4 normally maintains two rotational sector valves 5-5' in the opening position, each of which consists of two series of petals or slices 6-7 and 6'-7' of different dimensions, which can rotate about respective axes 8-8' between the opening position of the FIGS. 1-4 and 6 and the closing position in FIGS. 5 and 7.

The functions and operative modes of the sleeve 4 are, for example, described in Italian patent application MI2009A002146 filed on Dec. 4, 2009 by the Applicant.

Each rotational sector 6-7 of the control valve 5 located upstream in the direction of flow of the fluid product is rotational about the axis 8 thereof under the basis of a respective automatically closing device, indicated by reference numeral 9 as a whole. Each device 9 comprises within a containment body 10-11, a fixed body 12 and a mobile body 13 axially sliding with respect to the fixed body 12 (FIGS. 4 and 5). A first chamber 14 is defined inside the fixed body 12 which extends within a first part of the mobile body 13 to the transversal wall 15, which abuts against a control heel 16 of a respective rotational sector 6-7 of the control valve. A helical spring 17 is housed within the first chamber 14, which can extend from the compressed configuration in FIG. 4 to the elongated condition in FIG. 5. The elongation of the spring 17 occurs automatically when the sleeve 4, according to the methods explained in Italian patent application MI2009A002146, is removed axially from inside the valve 5 ceasing the withholding action thereof on the rotational sectors 6 and 7 of the valve itself.

Figure 8:
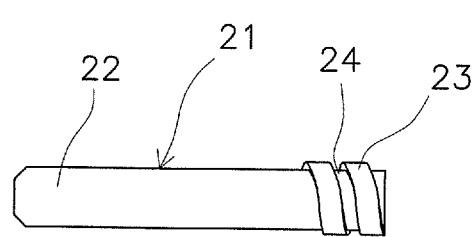
FIG. 8-10 show possible embodiments of the regulation cartridge of the closing speed of the rotational sectors of the upstream control valve.
Figure 9:
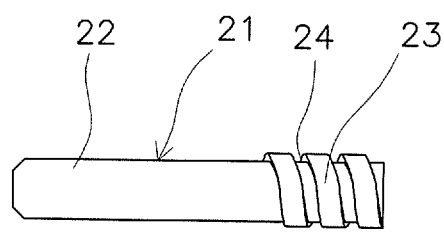
Figure 10:
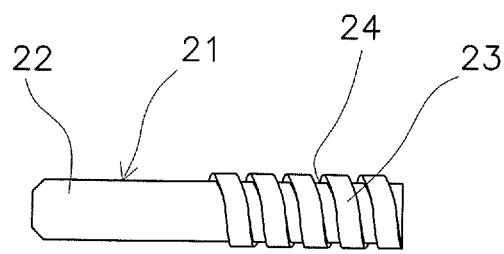

A second chamber 18 is defined on the opposite end of the sliding body 13 in which braking fluid, of approximately chosen viscosity, is normally accommodated. The two chambers 14 and 18 communicate by means of a passage duct 19, which has a widened inlet part 20 in which a flow speed regulation cartridge 21 is inserted, which has a cylindrical part 22 on an inlet side 23 provided with a helical external groove 24. Examples of cartridges 21 with different extensions of the external grooves 24 are shown in FIG. 8-10.

The described communication between the chambers 14 and 18 has the effect of causing the leakage of braking fluid from chamber 18 to chamber 14 during the movement of the sliding body 13 from the position in FIG. 4 to that in FIG. 5, caused by the thrust of the spring 17 in absence of the sleeve 4 and, during the closing rotation of the valve sectors 6-7, by the pressurized fluid which flows through the union part 1. The passage of braking fluid slows down the closing speed of the valve avoiding abrupt impacts which could damage the rotational sectors of the valve itself. Sudden increases of pressure, known as water hammers, are thus avoided.

The passage speed, and thus the closing speed of the single rotation petals, depends on the section of the passage duct 19, the diameter of the cylinder part 22 of the cartridges 21 and the extension of the helical external grooves 24 of the cartridges 21 and may be modified by replacing the cartridges with others of different diameter and with different grooves. It is thus possible to envisage the use of cartridges of one type for rotational sectors 6 and cartridges of another type for rotational sectors 7, so as to determine different rotation speeds and thus closing speeds of the single sectors of the valve 5. This has the purpose of having a closure which limits the exit of product to the maximum during the closing of the rotation sectors or petals of the control valve, thus limiting the pressure peak generated by the water hammer to acceptable levels.

The rotational sectors 6'-7' of the control valve 5' downstream of the direction of flow of the fluids are, in turn, provided with automatic closing devices 9' which similarly have fixed bodies 12', sliding bodies 13' and normally compressed springs 17' which through the heels 16' determine the rotation, and thus the automatic closure, of the various rotational sectors 6-7 of the valve 5' in case of removal of the sleeve 4. A braking effect similar to that determined by the passage of braking fluid from chamber 18 to chamber 14 is missing instead. The braking effect is indeed determined by the pressurized fluid present in the union part 2.

The invention claimed is:

1. An automatic closure device of an upstream control valve in a separable connection unit for flexible pipes, wherein the upstream control valve comprises a plurality of sectors which rotate to an open position that allows fluid flow through the upstream control valve and to a closed position that prevents fluid flow through the upstream control valve, wherein the automatic closure device comprises, for each sector of the upstream control valve, a sliding body disposed in a body of the upstream control valve between a first chamber and a second chamber and operating on said sector to cause closing and opening rotation thereof, elastic means housed in the first chamber to activate said sliding body in a direction suitable to cause the closing rotation of said sector, a braking fluid housed in the second chamber to brake the movement of said sliding body in the closing direction of said valve sector, and fluid-dynamic communication means disposed within the sliding body and providing fluid communication between said first chamber and said second chamber to consent the controlled transfer of said braking fluid from the second chamber to the first chamber during the movement of said sliding body in the direction of closure of said valve sector, said fluid-dynamic communication means comprising a small passage duct with an enlarged part and a cartridge inserted in said enlarged part, and said cartridge having a cylindrical part and a grooved part provided with external grooves.

2. The device according to claim 1, wherein said grooved part is of variable length.

* * * * *